(12) United States Patent  
Li et al.

(10) Patent No.: US 7,206,319 B2
(45) Date of Patent: Apr. 17, 2007

(54) FIXED COLLISION RATE BACK OFF METHODS AND SYSTEMS

(75) Inventors: Chih Peng Li, Kaohsiung (TW); Robert Chuenlin Wang, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 805 days.

(21) Appl. No.: 09/848,622

(22) Filed: May 3, 2001

(65) Prior Publication Data

US 2002/0163929 A1    Nov. 7, 2002

(51) Int. Cl.
*H04L 12/413* (2006.01)
(52) U.S. Cl. .................... 370/448; 370/462
(58) Field of Classification Search ............. 370/448, 370/443, 444, 445, 447, 458, 461, 462
See application file for complete search history.

(56) References Cited

U.S. PATENT DOCUMENTS

| | | | |
|---|---|---|---|
| 5,390,181 A * | 2/1995 | Campbell et al. | 370/444 |
| 5,699,515 A * | 12/1997 | Berkema et al. | 370/448 |
| 6,215,792 B1 * | 4/2001 | Abi-Nassif | 370/458 |
| 6,614,799 B1 * | 9/2003 | Gummalla et al. | 370/448 |
| 2002/0163929 A1 * | 11/2002 | Li et al. | 370/448 |
| 2002/0188750 A1 * | 12/2002 | Li | 709/235 |

FOREIGN PATENT DOCUMENTS

| | | |
|---|---|---|
| EP | 0 524 675 A | 1/1993 |
| EP | 0 877 511 A | 11/1998 |

OTHER PUBLICATIONS

Field J A et al: "A Carrier Sense Multiple Access (Collision Detection) System With Global Information" Computer Networks. Washington, Sep. 20-23, 1982 Digest of Papers From Compcon. Fall, Computer Society International Conference, New York, I.E. E.E, US , vol. Conf. Sep. 25, 1982, pp. 511-520, XP00811222 *the whole document*.

* cited by examiner

*Primary Examiner*—Huy D. Vu
*Assistant Examiner*—Christine Ng

(57) ABSTRACT

A system and method for data collision resolution wherein the same back-off window is sent to a plurality of remote users and is recalculated to maintain a constant collision rate and thereby increase throughput. The collision rate of the network is estimated in the present invention by detecting collisions in reservation slots and the size of the back-off window is adjusted to maintain a collision rate of approximately $1-2/e$.

11 Claims, 7 Drawing Sheets

FIXED COLLISION RATE BACK OFF METHODS AND SYSTEMS

FIELD OF THE INVENTION

The invention generally relates to data contention resolution in which a plurality of users are contending for access to a data network, and more particularly, to a system and method for resolving data collisions.

BACKGROUND OF THE INVENTION

In any network in which multiple users are connected to a shared communications channel, there is typically a method to resolve which user obtains use of the channel when there is contention. When two or more users attempt to transmit data simultaneously in the same bandwidth, a collision can occur and data can be lost. The various methods to resolve contests between users and to recover from data collisions are often called Medium Access Control (MAC) protocols.

A major category of MAC protocols is the random access type. These protocols adopt package contention techniques, such as Slotted ALOHA or Carrier Sense Multiple Access (CSMA) to handle channel contention. Slotted Aloha reduces the number of data collisions by dividing the channel into time slots and requiring that users transmit at the beginning of each slot. Collisions occur in Slotted Aloha systems when two or more users transmit to the same time slot simultaneously. CSMA reduces collisions by having users monitor the data channels to determine whether the channel is busy or available for transmission. Collisions occur in CSMA when two or more users simultaneously sense a channel is free and transmit at the same time.

A separate category of MAC protocols is the demand-assignment type. These protocols manage network contention by dividing the channel into reservation slots and requiring that users reserve a channel slot to transmit. Unlike the random access protocols, users on a demand-assignment system are assured that the data will transmit without collision once a successful reservation is made. Demand-assignment collisions still occur, however, in the reservation phase of the transmission when two or more users attempt to make reservations in the same bandwidth simultaneously.

Data collisions are a fact of life when multiple users are connected to a shared communications channel, regardless of whether a random access or demand assignment protocol is used. To avoid losing data every time a collision occurs, MAC protocols use collision resolution or back-off algorithms to recover from the collision and determine when to re-transmit the data that collided.

There are three widely-known types of back-off algorithms in the art. The first is a splitting algorithm, also known as a tree algorithm. The second type is an adaptive p-persistence algorithm, and the third is a binary exponential back-off (BEB) algorithm. Each algorithm takes a different approach to determine when to re-transmit data that previously collided.

No single standard exists to determine which of the three categories of back-off algorithms is best. One standard of performance is throughput. In general, throughput is the amount of data transferred from one user to another user in a specified amount of time. In contention resolution algorithms, throughput is often measured as a ratio of the number of successful transmissions to the total number of transmission opportunities. In a wireless internet access system that uses a demand-assignment protocol, for example, throughput is the ratio of the number of successful reservations made to the total number of reservation slots available.

Of the three aforementioned classes of back-off algorithms, tree algorithms generally have the highest throughput. Although their maximum stable throughput remains unknown, tree algorithms have achieved throughputs of 0.4878. However, this higher throughput comes with a price. The tree algorithm is by far the most sophisticated of the three back-off algorithms to implement and the number of networks that can implement a tree algorithm is limited because the algorithm requires that the users have full knowledge of the three possible conditions (success, collision, idle) for every reservation slot.

The second type of back-off algorithm is an adaptive p-persistence algorithm. An adaptive p-persistence algorithm operates by calculating a retransmission probability p determined by estimating the number of active users (users who are competing for the bandwidth) using feedback from the reservation slots. The algorithm increases p when an idle slot occurs and decreases p when a collision is detected. When there are infinite number of users in the system, the maximum achievable throughput of adaptive p-persistence algorithms is at most $1/e=0.3679$. Under such circumstances, idles occur with a probability of $1/e\sim0.3679$, and collisions occur with a probability of $1-2/e\sim0.2642$.

As with a tree algorithm, an adaptive p-persistence algorithm requires feedback about the data channels that many networks do not provide. In many systems, including many computer and wireless communication networks, individual users know whether or not their own packets transmit successfully, but have no information about the status of other channels in the network. Because so many multi-user systems (including Ethernet, CATV and wireless networks) do not provide the requisite channel feedback, the BEB algorithm is often adopted for collision resolution.

Unlike tree and adaptive p-persistence algorithms, a BEB algorithm does not require that users provide feedback about every data channel. BEB operates as follows: an immediate first transmission is made as soon as a packet arrives at the head of the transmit queue. If the transmitting user detects a collision, it re-transmits k slots later, where k is a random integer number uniformly distributed over the interval [1, $2^i$]. The interval over which the uniformly distributed number is drawn is hereafter referred to as the back-off window. If i (the number of collisions) is greater than 16, the packet is lost and dropped. Once a packet is either transmitted successfully or is dropped, i is reset to zero. The logic that underlies BEB is that, for a given packet, a high number of unsuccessful transmissions implies that more users are contending for the available bandwidth and a larger Back-off window should be opened.

One of the downsides of BEB is that it suffers from a couple of performance problems. First, it causes the network to become unstable as the number of users grows very large. That is, as the number of users on a system approaches infinity the throughput of a BEB system approaches zero. In addition, BEB results in a last-come-first-serve effect among the competing users. Specifically, a user that has a packet newly arrived at the head of the transmit queue has a higher probability of acquiring a reservation slot than does a user that has already been in the queue and experienced one or more collisions. This occurs because the user whose packet just arrived in the queue will have a relatively smaller back-off window than the user that has already experienced several collisions. This is called the capture effect because it allows a single or a few winning users to dominate the available bandwidth.

Thus, an unsatisfied need exists in the industry for an improved method for resolving data collisions that overcomes deficiencies in the prior art, some of which are discussed above.

SUMMARY OF THE INVENTION

A system and method for data collision resolution wherein the same back-off window is sent to a plurality of remote users and is dynamically adjusted to maintain a collision rate and thereby enable improved throughput. In accordance with one embodiment, collision rate is estimated by detecting collisions in reservation slots and the size of the back-off window is adjusted to maintain a collision rate of approximately $1-2/e$.

In accordance with an embodiment of the present invention, a method is disclosed wherein a first back-off window is sent to all users of a network, a second back-off window is calculated based on one or more operational characteristics of the network and the second back-off window is then sent to the users. An embodiment of the present invention further discloses a method of calculating the back-off window based on the collision rate of the system, and, in another embodiment, the back-off window is adjusted to maintain a constant collision rate of approximately $1-2/e$. In still another embodiment of the present invention, the status of one or more reservation slots is used to estimate the collision rate of the system.

In accordance with another embodiment of the present invention, a method for collision resolution is disclosed wherein a common back-off window is sent to all users of a network and the back-off window is dynamically adjusted to maximize throughput. Another embodiment discloses dynamically adjusting the back-off window based on collision rate and, in another embodiment, the back-off window is adjusted to maintain a constant collision rate of approximately $1-2/e$. In yet another embodiment, the back-off window size is adjusted to keep the number of users on the system approximately equal to the back-off window.

In accordance with another embodiment of the present invention, a system for resolving data collisions in a shared network is disclosed, wherein the system includes a plurality of remote devices and an access point, such that the access point includes a switch for communicating with the plurality of users, a transceiver for sending and receiving information to and from the plurality of users, and a collision resolution device that calculates an initial back-off window that is sent to the plurality of users, estimates the collision rate of the system, and dynamically adjusts the back-off window to substantially maintain a constant collision rate.

BRIEF DESCRIPTION OF THE DRAWINGS

Figure 1:
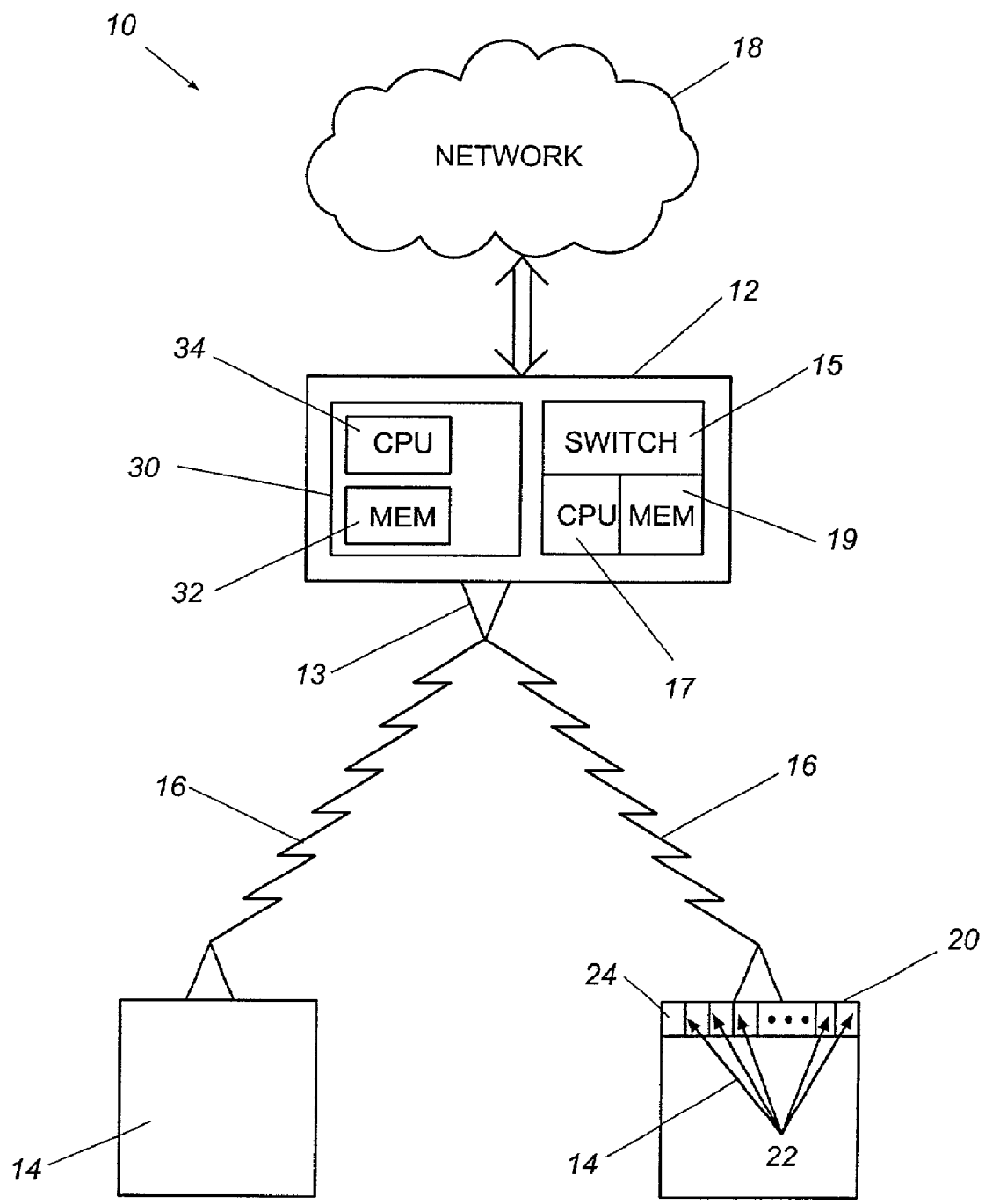

Having thus described the invention in general terms, reference will now be made to the accompanying drawings, which are not necessarily drawn to scale, and wherein:

FIG. 1 is a schematic illustration of a communication network; and

Figure 2:
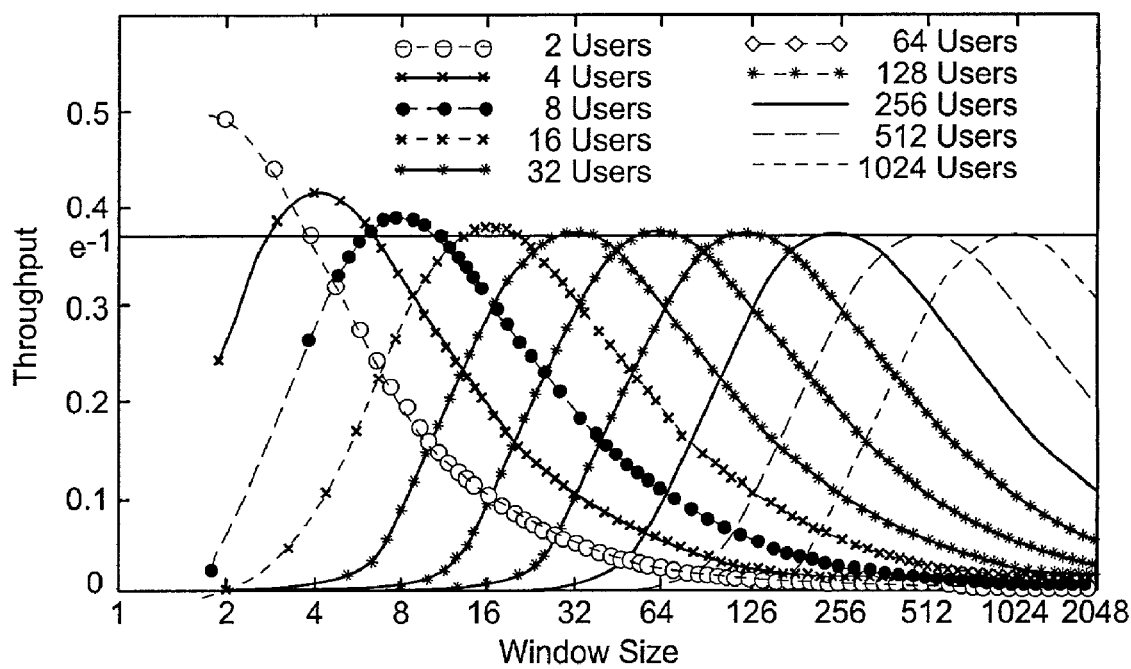

FIG. 2 is a graph that relates throughput to back-off window size for varying numbers of active users.

Figure 3:
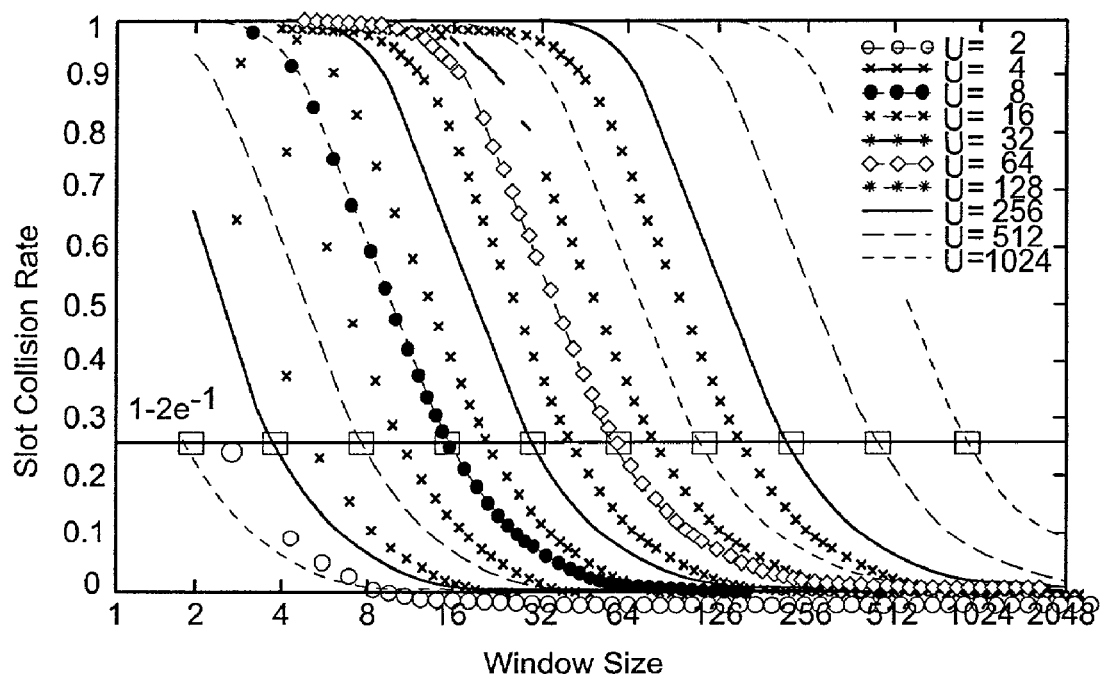

FIG. 3 is a graph that relates slot collision rate to back-off window size for varying numbers of users.

Figure 4:
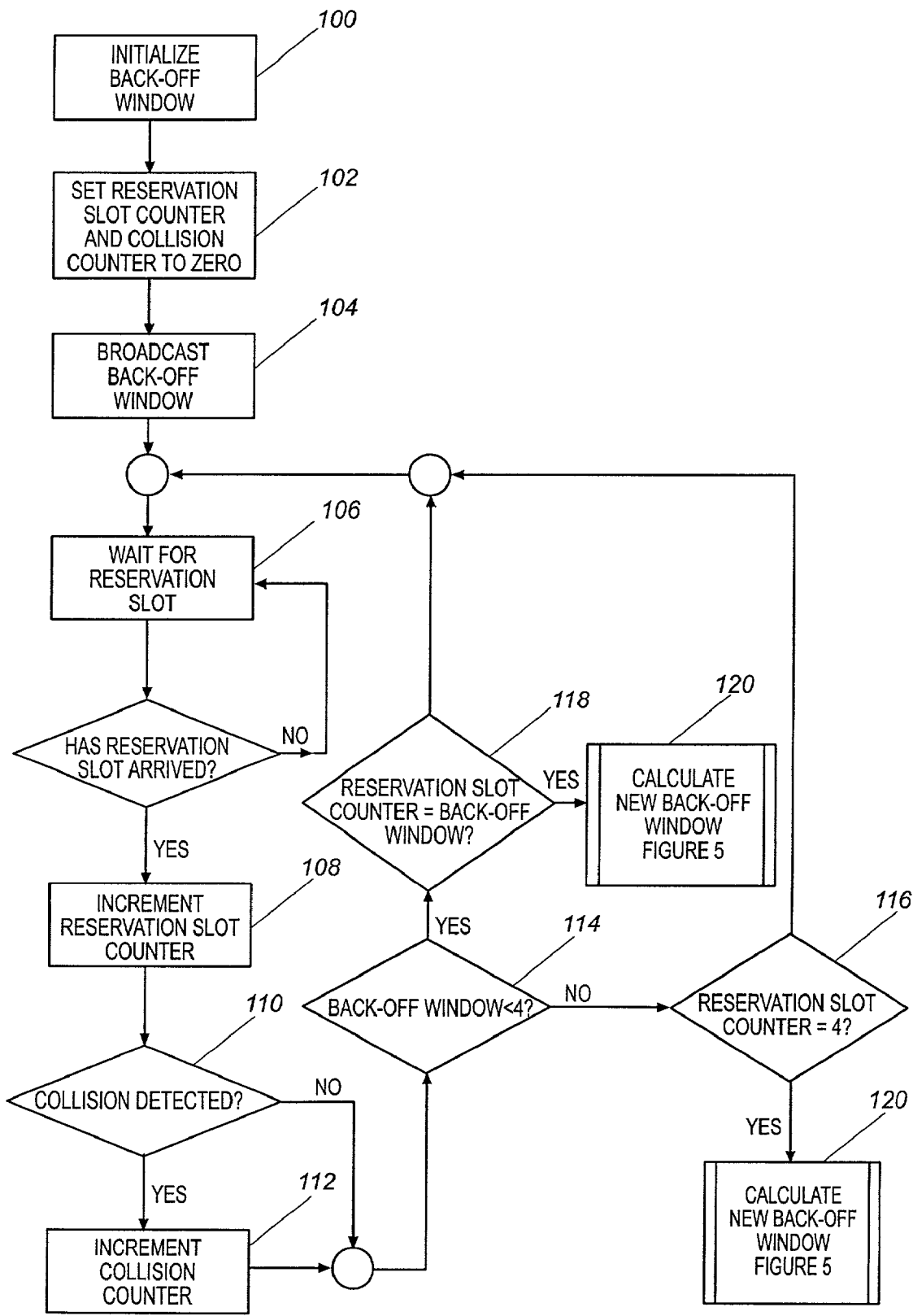

FIG. 4 is a flowchart illustrating a method in accordance with the present invention that allows an access point to track reservation slots and collisions.

Figure 5:
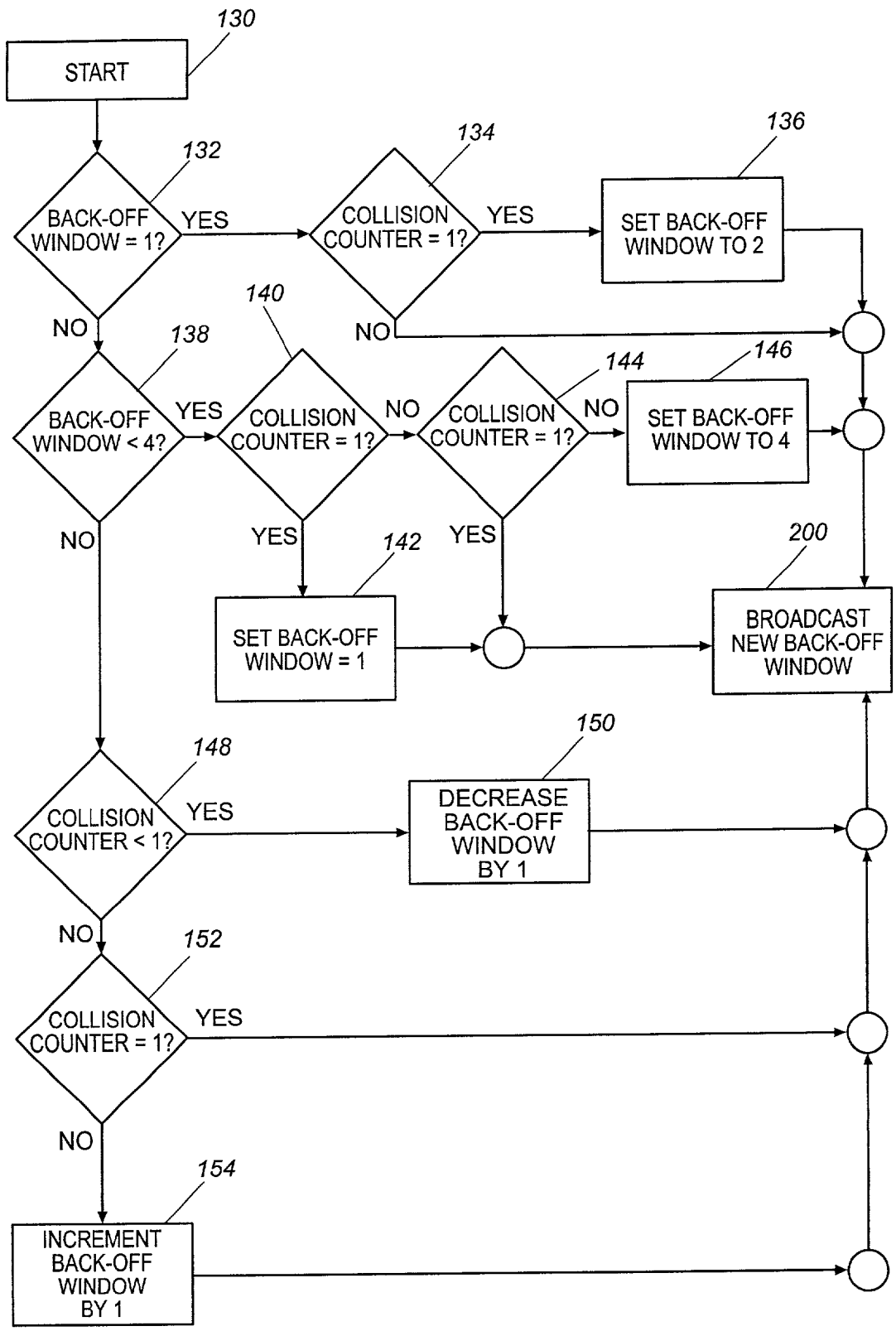

FIG. 5 is a flowchart illustrating a method in accordance with the present invention that allows an access point to dynamically adjust the back-off window.

Figure 6:
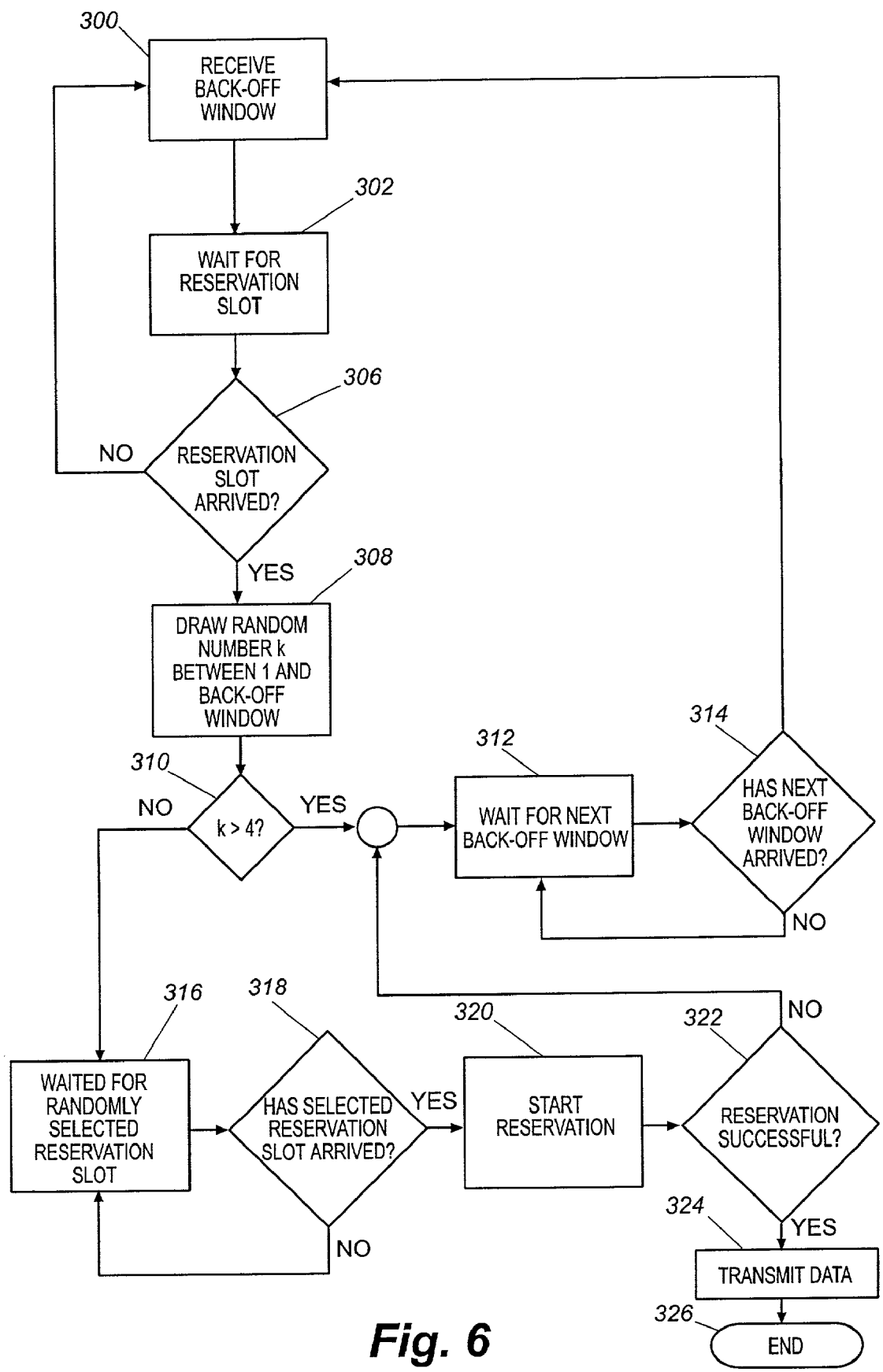

FIG. 6 is a flowchart illustrating a method in accordance with the present invention from the point of view of the wireless device.

Figure 7:
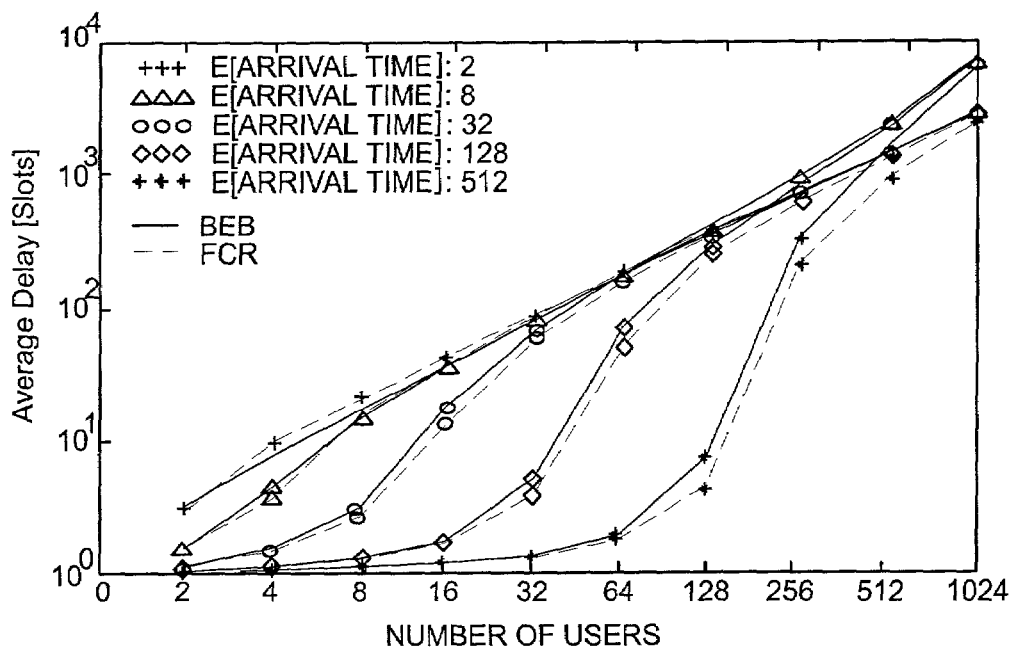

FIG. 7 is a graph that compares the average packet delay of a method in accordance with the present invention with that of a BEB algorithm.

Figure 8:
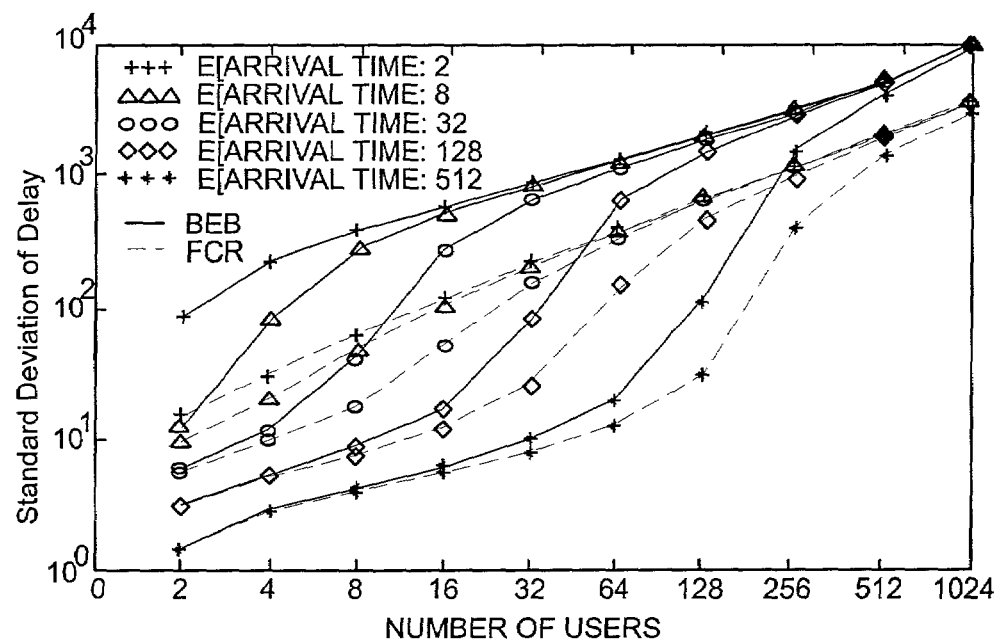

FIG. 8 is a graph that compares the standard deviation of delay of a method in accordance with the present invention with that of a BEB algorithm.

Figure 9:
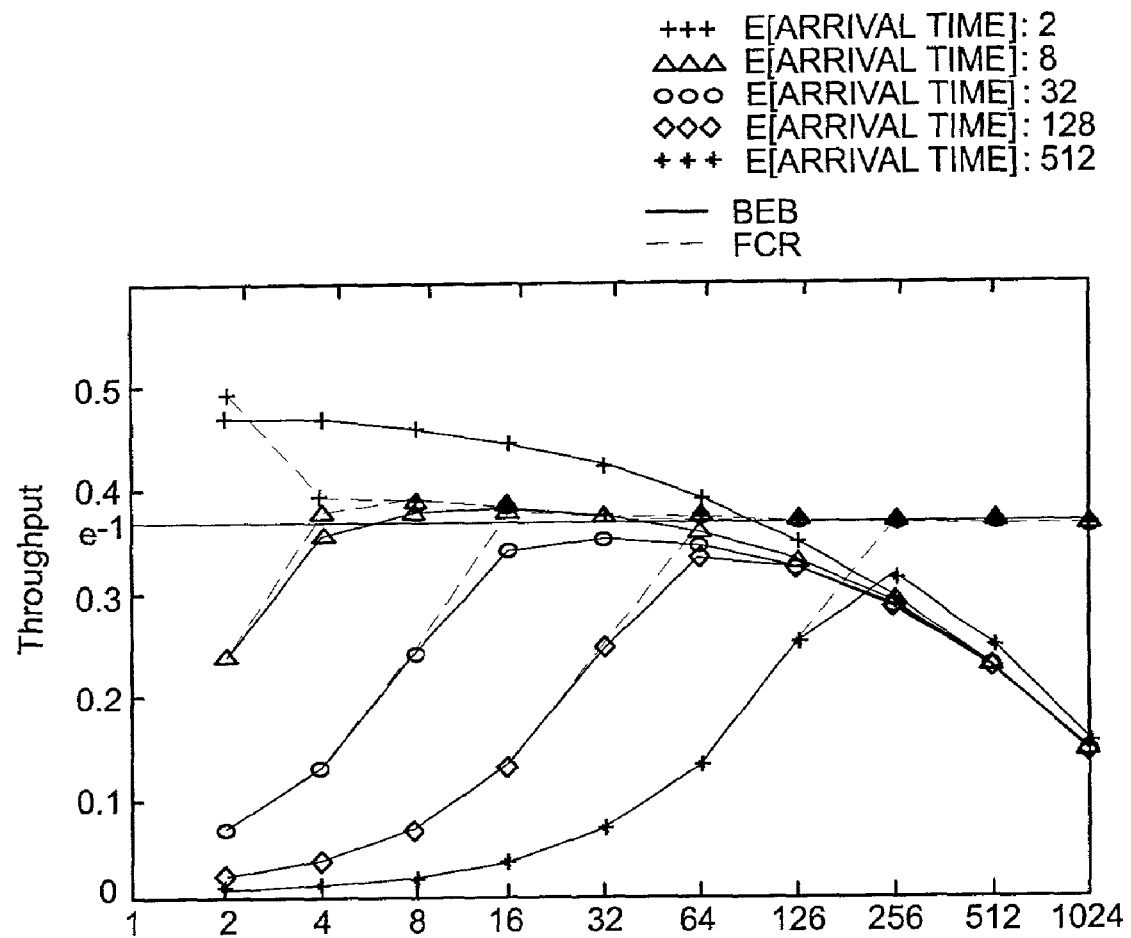

FIG. 9 is a graph that compares the throughput of a method in accordance with the present invention with that of a BEB algorithm.

DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

I. Architecture

In the following paragraphs, the present invention is described in terms of a wireless internet access system. This is for illustration purposes only. It will be readily apparent to one of ordinary skill in the art that the present invention can be applied in any network environment that uses slotted and time-sharing protocols, including without limitation cable television ("CATV"), packet resolution multiple access systems ("PRMA") and any generic time-division multiplexing system.

With reference to FIG. 1, a wireless internet access system 10 includes an access point 12 in communication with a plurality of wireless devices 14, such as personal digital assistants, cell phones or any other computing device equipped with a wireless modem. A wireless communications link 16 communicatively couples the wireless devices 14 to the access point 12, preferably via a bi-directional link. The access point 12 sends information to and receives information from the plurality of wireless devices 14 via a transceiver 13. The access point 12 operates as a base station to a network 18 and includes a collision resolution device 30 (the operation of which is described in section II below) which, in accordance with the present invention, controls and dynamically adjusts the back-off window. The access point 12 may further include such elements as a switch 15 and a microprocessor 17 with associated memory 19 to control the switch and provide access to the network 18. For purposes of illustrating the preferred embodiment, the communication from the access point 12 to the wireless devices 14 occurs in the downstream direction and is controlled and scheduled by the access point 12. Communication in the upstream direction, from the wireless devices 14 to the access point 12, occurs through reservation slots of a demand-assignment protocol (discussed below).

Each wireless device 14 using the wireless communication link 16 will have a transmission queue 20 for holding data packets 22 that the device needs to transmit. For example, as seen in FIG. 1, the wireless device 14 has an earliest packet 24 placed in the transmission queue 20. The packet 24 will be the first transmitted once the communication link 16 is available to the access point 12.

When a packet arrives at the head of the transmission queue 20, the wireless device 14 reserves bandwidth on the wireless communications link 16 through reservation slots. There is competition between wireless devices 14 as they attempt to make a reservation in a reservation slot and packet collision can occur. If a wireless device 14 makes a successful reservation and the access point 12 receives the packet 24 without collision or error, the access point 12 allocates bandwidth for data transmission and the wireless device 14 transmits its data in the allocated bandwidth without risk of collision. If, however, two or more wireless devices 14 simultaneously attempt to make a reservation in the same reservation slot, the packets collide and neither reservation succeeds. When this happens, the two or more wireless devices 14 must back-off and wait a random period of time before attempting another reservation.

The collision resolution device 30 checks the status of each reservation slot to determine whether a collision has occurred and recalculates the back-off window in accordance with the fixed collision rate (FCR) algorithm (described below) to maintain a substantially constant collision rate of $1-2/e$ and thereby maximize throughput. In a preferred embodiment, the collision resolution device 30 maintains a substantially constant collision rate of 0.25, which is relatively close to $1-2/e$ ($\sim$0.2642). The collision resolution device 30 estimates the collision rate of the system by determining whether a collision occurred in a given reservation slot. When more than 25% of the reservation slots are in collision, the collision resolution device 30 increases the size of the back-off window and when less than 25% of the reservation slots are in collision, the back-off window is decreased. The collision resolution device 30 sends the recalculated back-off window to the access point 12 and the access point 12 which sends the new back-off window to the remote devices 14.

In a preferred embodiment, the FCR algorithm is implemented via software stored in memory 32 wherein the collision resolution device 30 uses a central processing unit 34 to interact with the memory 32 and execute the algorithm. It is understood, however, that the computer instructions that execute the algorithm can also be implemented in hardware, software or firmware. These computer program instructions may be loaded onto a general purpose computer, special purpose computer, or other programmable data processing apparatus to produce a machine, such that the instructions which execute on the computer or other programmable data processing apparatus create means for implementing the functions specified herein.

II. Operation

The following paragraphs describe in detail the FCR algorithm, a new method of collision resolution according to an embodiment of the present invention and describe FCR in the context of the wireless internet access system of FIG. 1. The disclosed method can be implemented on many different systems because, unlike the tree and p-persistence algorithms, the FCR back-off algorithm which is the subject of the present invention does not require that individual users have full knowledge of the status of every other channel in the network. In that respect, at least, the present invention is more akin to a BEB algorithm than either the tree or p-persistence algorithms. FCR, however, avoids many of the performance problems, such as instability and capture effect, that occur with BEB.

Another difference between FCR and other back-off algorithms known in the art is that FCR assigns the same back-off window to every user in the network. This means that every user will have the same chance of obtaining network resources regardless of how many times the user's data has previously collided. FCR thus shares the network resources in a fairer way and, at the same time, avoids the capture effect found in BEB.

FCR maintains a high throughput by periodically recalculating the common back-off window and sending the new back-off window to users. FCR recalculates the back-off window based on one or more operational characteristics of the network. For example, in one embodiment FCR recalculates the back-off window to maintain collision rate. In another embodiment, back-off window size corresponds to the number of users on the system.

The inventors of the present invention determined through Monte Carlo simulation techniques that maximum throughput occurred on a wireless internet network when the number of active users in the network equaled the size of the back-off window. They also discovered that when throughput was maximized, the collision rate of the network stayed constant at $1-2/e$ and that this collision rate remained constant as the number of active users on the network increased. These discoveries were confirmed mathematically.

The inventors ran Monte Carlo simulations to calculate throughput for a different number of active users U using different back-off windows (represented as W). Note that as used in the following discussion of the simulation results, "users" and "active users" are differentiated. Users are recognized by the system but are idle or otherwise not competing for channel bandwidth. Active users, on the other hand, are those users that have packets waiting in the queue for immediate transmission and are competing with other active users for channel bandwidth. The results of the active user-throughput simulations are seen in FIG. 2, for U=2, 4, 8, 16, 32, 64, 128, 256, 512 and 1024. The first conclusion drawn from FIG. 2 is that maximum throughput occurs when U=W (when the number of active users equals the back-off window). The second conclusion drawn from FIG. 2 is that, as the number of active users approaches infinity, the maximum achievable throughput approaches $1/e$=0.3679. Thirdly, when the number of active users is small, a higher throughput is possible. For example, FIG. 2 shows that when two active users compete for bandwidth, a throughput of as high as 0.5 is attainable.

The graph of FIG. 3 is another product of the Monte-Carlo simulations. FIG. 3 compares slot collision rate to back-off window size (W) for U=2, 4, 8, 16, 32, 64, 128, 256, 512 and 1024. As used here, slot collision rate is the ratio of slots in collision to the total number of slots. FIG. 3 shows that the slot collision rate is a decreasing function of back-off window size. Note that squares are used to show the value of slot collision rate at the point where W=U and that when the number of active users equals the back-off window size, slot collisions occur at an almost constant rate of $1-2/e$~$0.2642$. Importantly, the slot collision rate remains almost constant as the number of active users on the system increases.

The following paragraphs provide the mathematical derivation that underlies the Monte Carlo simulation results set forth in FIGS. 2 and 3.

Let n be the number of active users. If P is the probability that an active user will pick reservation slot number 1, where the active user is randomly picking a number between 1 and the back-off window W, then $p=1/W$. Where, as here, all active users are assigned the same back-off window, the number of active users picking contention slot 1 has a binomial distribution with parameters p and n, such that:

$P_0=(1-p)^n=$Probability that no user picks reservation slot one $P_1=np(1-p)^{n-1}=$Probability that one user picks reservation slot one Because throughput occurs when a single active user is the only active user to randomly select a particular reservation slot, the probability of throughput can be represented as $P_1=np(1-p)^{n-1}$. In this equation, $P_1$ is a unimodal function in p and has a peak value of $P_{1max}=(1-1/n)^{n-1}$ when $p=1/n$. Throughput, then, is maximized when the back-off window equals the number of active users and, as n approaches infinity, $P_{1max}=(1-1/n)^{n-1} \to 1/e$.

The other side of the equation is that a collision occurs when more than one active user selects the same reservation slot to make a reservation. The probability of a collision occurring (the collision probability C) can be represented as:

$C=1-P_0-P_1=1-(1-p)^n-np(1-p)^{n-1}=1-(1-p)^{n-1}(1+(n-1)p)$

Notably, as the number of active users approaches infinity, the collision probability approaches $1-2/e$~$0.2624$. Moreover, when throughput is maximized, that is, when $W=U$ and $p=1/n$, the probability of collision approaches $1-2/e$ for all n values and can be represented as:

$C_{opt}=1-(1-1/n)^{n-1}(2-1/n)$, where $C_{opt}$ is the probability of collision at maximum throughput.

The foregoing simulation and mathematical analysis demonstrate that maximum throughput occurs when the back-off window size equals the number of active users on the system and, when this state of maximum throughput is reached, packet collisions occur at a constant rate of $1-2/e$.

In practice, few systems have the ability to track either the number of active users or the slot collision rate. The inventors sought to come up with a new back-off algorithm that does not require a smart system, that is, a system with full knowledge (idle, success, collision) of the status for every channel on the system. To that end, they developed the FCR algorithm which accurately estimates slot collision rate using channel status information that is available in any centrally controlled system. FCR then dynamically recalculates the back-off window to maintain an estimated collision rate of approximately $1-2/e$~$0.2642$. This, in turn, ensures that the system operates at maximum throughput.

An embodiment of the method according to the present invention is described in detail in the following paragraphs. The embodiment is described in terms of a wireless internet access system, but those skilled in the art will readily recognize that FCR can be used in any shared network environment that uses slotted and time-sharing protocols.

In the described embodiment, a new back-off window is broadcast at least every four reservation slots. These four reservations slots are referred to herein as the history length of reservation. The history length of reservation is the number of reservation slots that are used by FCR to estimate the slot collision rate. Four reservation slots are used because 0.25 is relatively close to the target slot collision rate of $1-2/e$~$0.2642$. However, it will be readily apparent to those of ordinary skill in the art that the history length of reservation can be adjusted to more accurately estimate the slot collision rate or to broadcast back-off windows with greater frequency. While an increase in the size of the history length of reservation provides a more accurate estimate of collision rate, a larger history length means that the back-off window is adjusted less frequently. Simulation results show that using other history lengths of reservation does affect performance; however, increases in throughput were minimal.

FIG. 4 is a flow diagram that summarizes how FCR uses reservations slots and collision counters to estimate the slot collision rate and to dynamically adjust the back-off window broadcast to all wireless devices 14 (active users).

With reference to FIG. 1 and FIG. 4, a starting back-off window is initialized in Step 100. An initial back-off window of one is often used. In Step 102, a reservation slot counter and a collision counter are set to zero. The reservation slot counter tracks the total number of reservation slots and the collision counter tracks the number of reservation slots that resulted in collision. As discussed, a reservation slot is a portion of the data channel used by the wireless devices 14 to reserve bandwidth on the channel. Once a wireless device 14 makes a successful reservation, the access point 12 allocates bandwidth for data transmission and the wireless device 14 uses the bandwidth to transmit data upstream to the access point 12. Collisions occur in the reservation slot when two or more wireless devices 14 attempt to reserve the same reservation slot simultaneously.

Once the back-off window is initialized and the reservation and collision counters are set to zero, the access point 12 broadcasts the back-off window to the wireless devices 14 (Step 104) and waits for the next reservation slot (Step 106).

When the reservation slot arrives, the reservation slot counter is incremented by one (Step 108) and a determination is made whether a collision occurred in the reservation slot. Multiple methods to detect collisions are known by those with ordinary skill in the art and an exhaustive review of those methods is beyond the scope of this document. In essence, if the access point 12 receives garbled data or data otherwise in error, FCR assumes a packet collision has occurred and increments the collision counter by one (Step 112).

The access point 12 does not broadcast a new back-off window until a sufficient number of reservation slots have been received to estimate the slot collision rate. In this embodiment, the history length of reservation is four; therefore, if the reservation counter has not reached four (Step 116), FCR returns to step 106 and waits for the next reservation slot to arrive. An exception to this rule occurs when the back-off window size is less than the history length of reservation (Step 114). In this embodiment, if the back-off window is less than four and the reservation counter is less than the back-off window, FCR returns to step 106 and waits for the next reservation (Step 118). When, however, the back-off window is less than four (Step 114) and the reservation counter equals the back-off window (Step 118), FCR estimates the slot collision rate, calculates a new back-off window (Step 120) and the access point 12 broadcasts the new back-off window.

FIG. 5 is a flow diagram that shows an illustrative method of the operation of FCR estimating the slot collision rate and using that estimate to calculate a new back-off window in accordance with an embodiment of the present invention. As already explained, the estimate and back-off window calculation (Step 130) occur when either: a) the reservation counter reaches the history length of reservation, or b) the back-off window is less than the history length of reservation and the reservation counter equals the back-off window.

In Step 132, FCR checks the size of the back-off window. A back-off window of one means that the access point 12 has received only one reservation slot since the last back-off window was broadcast. In Step 134, FCR checks the collision counter to see if a collision occurred in the single reservation slot that was received. If there was no collision, FCR proceeds to Step 200 and the access point 12 broadcasts the same back-off window (size one) to the wireless devices 14. If, on the other hand, there was a collision (collision counter equals two), FCR increases the back-off window to two (Step 136) and the access point 12 broadcasts the larger back-off window (Step 200).

If the back-off window is greater than one but less than four (Step 138), FCR proceeds to Step 140. At Step 140, the reservation slot counter has a value of either two or three and FCR checks the collision counter to determine how many collisions occurred in these slots. If zero collisions occurred, the back-off window is set to one (Step 142) and is broadcast (Step 200). If one collision occurred (Step 144), the back-off window is not changed and is re-broadcast (Step 200). Finally, if more than one collision occurred, the back-off window is set to four (Step 146) and is broadcast (Step 200).

In this embodiment, FCR reaches Step 148 when the size of the back-off window is greater than or equal to four (the history length of reservation). This means that four reservation slots have occurred since the last back-off window was broadcast. In Step 148, FCR checks the collision counter to determine how many collisions have occurred. If there have been no collisions, FCR decrements the size of the back-off window by 1 (Step 150) and broadcasts the smaller back-off window (Step 200). If a single collision occurred (Step 152), the back-off window is not changed and is re-broadcast (Step 200). Finally, if more than one collision occurred, the back-off window is incremented by 1 (Step 154) and is broadcast (Step 200).

FIG. 6 is a flow diagram that illustrates FCR from the point of view of one of the plurality of wireless devices 14. In Step 300, a wireless device 14 receives a back-off window. In Step 302, the wireless device 14 begins to wait for a reservation slot (access to the channel). If a reservation slot is desired, the wireless device 14 continues to wait until a slot arrives (Step 306). Once the reservation slot arrives, FCR proceeds to Step 308. In Step 308, the wireless device 14 randomly selects a number (k) between one and the size of the back-off window. For example, if the size of the back-off window is two, then the random selection will be either one or two. The random number identifies which of the upcoming reservation slots the wireless device 14 will use to attempt another reservation. In Step 310, FCR determines whether the random number selected in Step 308 is greater than four (the history length of reservation). If the random number is greater than four, the wireless device 14 will not attempt a reservation, but will wait (Step 312) for the next back-off window. When the new back-off window arrives (Step 314), the wireless device 14 returns to Step 300.

If the random number selected in Step 310 is less than four then FCR proceeds to Step 316 and the wireless device 14 waits for the reservation slot that corresponds to the randomly selected number (Step 318). When the randomly selected reservation slot arrives, the wireless device 14 attempts to make a reservation in the reservation slot (Step 320). The reservation succeeds if the wireless device 14 is the only device to attempt a reservation in the particular reservation slot. The reservation fails, however, and collision occurs, if two or more wireless devices 14 attempt a reservation in the same reservation slot. If the reservation is successful, the wireless device 14 is allocated channel bandwidth for data transmission (Step 324). Once the allocation is made, the wireless device 14 transmits the data in the queue. When the data transmission completes, FCR ends until the next collision (Step 326). If FCR determines in Step 322 that the reservation attempt of Step 320 failed, the wireless device 14 proceeds to Step 312 and waits for the next back-off window.

The apparatus and method according to the present invention provide a back-off algorithm that is superior in many ways to the other back-off algorithms known in the art. Unlike tree and p-persistence algorithms, FCR does not require that the network have full knowledge of the three possible statuses (idle, collision, success) for every channel in the network. As a result, FCR can be implemented with relative ease and little expense and is available for implementation on networks that do not provide the feedback required by the tree and p-persistence algorithms.

FCR has advantages over BEB as well. The graph in FIG. 7 compares the average packet delay of FCR and BEB. Arrival time, as used herein, measures how often active users attempt reservations. A low arrival time means that active users are aggressively seeking channel resources and, as a result, few reservation slots pass without a reservation attempt. In contrast, a higher arrival time means that active users are not attempting reservations as often and a relatively larger number of reservation slots pass between reservation attempts.

FIG. 7 shows that FCR has a smaller average packet delay under most traffic patterns and system loads. The single exception occurs when there are few active users on the system ($4 \leq U \leq 64$) and the few users that are active are aggressively acquiring bandwidth (mean arrival time=2 slots). Under these limited conditions, BEB appears to have a lower average packet delay than FCR. However, the successful transmissions that occur in BEB under these conditions are dominated by the capture effect. What is happening in these conditions is that a few users are transmitting with little collision and many more users are experiencing increasing back-off window sizes.

FIG. 7 also shows that the difference in average packet delay between FCR and BEB increases with an increase in the number of active users. The performance benefit of FCR thus increases as the number of active users increases. For example, when there are 1024 users, the worst average packet delay of FCR is 2780 slots, while the best case for BEB is 6177 slots.

FIG. 8 shows the differences in standard deviation of delay between FCR and BEB. Standard deviation of delay determines how equitably the system is sharing the channel bandwidth between active users. A small standard deviation of delay implies that packets wait approximately the same amount of time before being transmitted successfully and, therefore, bandwidth is shared among competing users in a fairer way. A large standard deviation of delay, on the other hand, implies that bandwidth is not being shared by the competing users equally. Thus, when capture effect is present, a large standard deviation occurs since some of the packets transmit with a small probability of collision, while other packets have increasing larger back-off windows and a lower probability of successful transmission.

As discussed above in reference to FIG. 7, simulations showed that FCB has a lower average packet delay that BEB under almost all system conditions. The single exception occurs when there are a small number of active users that are aggressively competing for bandwidth. FIG. 8 reveals the reason for BEB's lower average packet delay under these particular conditions. When there are few users aggressively competing for bandwidth, BEB has a very large standard deviation of delay. This means that the lower average packet delay in these limited conditions is the result of capture effect. The figure shows that under these same conditions, FCR has a much lower standard deviation of delay than BEB and, therefore, does not experience capture effect. FIG. 8 further shows that FCR continues to have a lower standard deviation of delay as the number of active users increases and therefore, FCR consistently shares the system resources in a significantly fairer way.

FIG. 9 compares throughput for FCR and BEB. This figure shows that capture effect causes BEB to have a much higher throughput in the limited condition where there are few active users aggressively acquiring bandwidth. In all the other cases, FCR has a higher throughput than BEB, or there is negligible difference. Notably, FCR maintains a throughput of 1/e~0.3679 without regard to the number of active users on the network.

In concluding the detailed description, it should be noted that it will be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts, and equivalents of all means or step-plus function elements are intended to include any structure, materials or acts for performing their cited functions.

That which is claimed:

1. A method for resolving data collision in a network shared by a plurality of users, the method comprising:
    sending a first back-off window to each of the plurality of users of the network;
    estimating a collision rate over a history length of reservation, wherein the history length of reservation comprises four reservation slots;
    calculating a second back-off window based on at least one operational characteristic of the network, wherein one of the operational characteristics of the network comprises the collision rate over the history length of reservation; and
    sending the second back-off window to each of the plurality of users of the network at least every four reservation slots to maintain a substantially constant collision rate of approximately $1-2/e$.

2. The method of claim 1, further comprising calculating subsequent back-off windows based on at least one operational characteristic of the network and sending the subsequent back-off windows to each of the plurality of users of the network.

3. The method of claim 2, further comprising dynamically calculating subsequent back-off windows to maintain a substantially constant collision rate and sending the subsequent back-off windows to each of the plurality of users of the network.

4. The method of claim 1, further comprising dynamically calculating subsequent back-off windows based on a number of users on the network.

5. The method of claim 1, further comprising dynamically calculating subsequent back-off windows to maintain the back-off window approximately equal to a number of users.

6. A method for resolving data collision in a shared network, the method comprising,
    sending a common back-off window to each of a plurality of users of the network;
    estimating a collision rate over a history length of reservation, wherein the history length of reservation comprises four reservation slots; and
    recalculating and sending new back-off windows to each of the plurality of users of the network at least every four reservation slots to maintain a substantially constant collision rate of aoproximately $1-2/e$ and to increase throughput of the network.

7. The method of claim 6, further comprising dynamically calculating subsequent back-off windows to maintain a substantially constant collision rate of $1-2/e$ and sending the subsequent back-off windows to each of the plurality of users of the network.

8. The method of claim 7, wherein the step of dynamically recalculating and sending new back-off windows comprises calculating the back-off windows based on a number of users on the network.

9. The method of claim 7, wherein the step of dynamically recalculating and sending new back-off windows comprises calculating the back-off windows to maintain the back-off window approximately equal to a number of users.

10. A system for resolving data collisions in a shared network, comprising:
    a plurality of remove devices; and
    an access point in communication with the plurality of remote devices, wherein the access point further comprises:
    a switch for communicating with the plurality of remote devices;
    a transceiver for sending information to and receiving information from the plurality of remote devices; and
    a collision resolution device that calculates an initial back-off window to be sent to each of the plurality of remote devices and dynamically adjusts a back-off window to substantially maintain a predetermined constant collision rate of approximately $1-2/e$, wherein the collision resolution device estimates the collision rate of the network over a history length of reservation and wherein the history length of reservation comprises four reservation slots.

11. The system of claim 10, wherein the collision resolution device calculates subsequent back-off windows based on at least one operational characteristic of the network and sends the subsequent back-off windows to each of the plurality of users of the network.

* * * * *